July 15, 1924.  
F. T. MURRAY  
TIRE RIM  
Original Filed March 5, 1923   2 Sheets-Sheet 1  
1,501,360
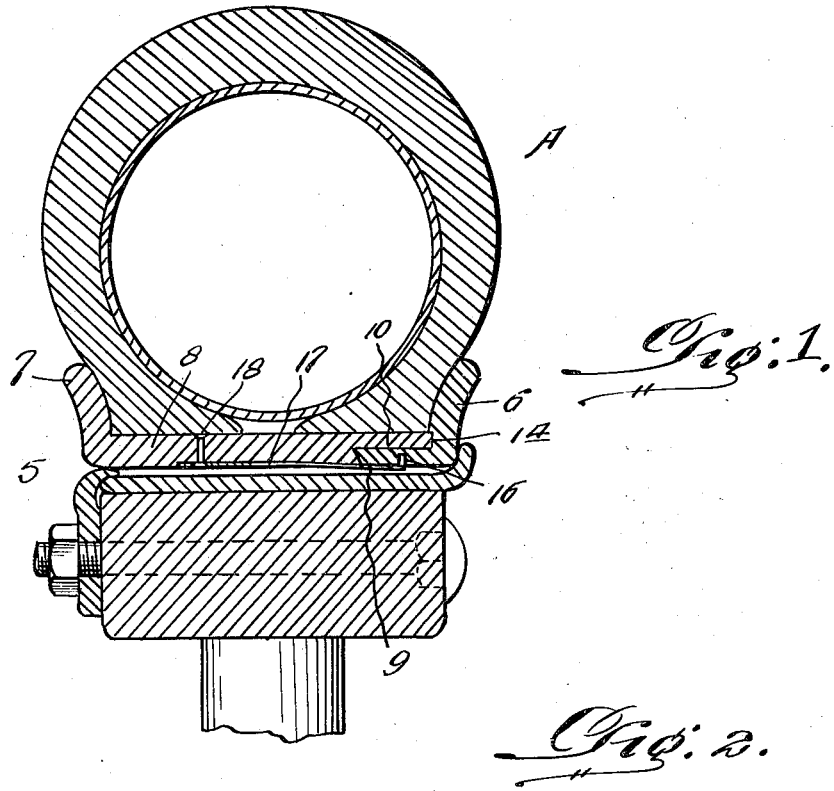
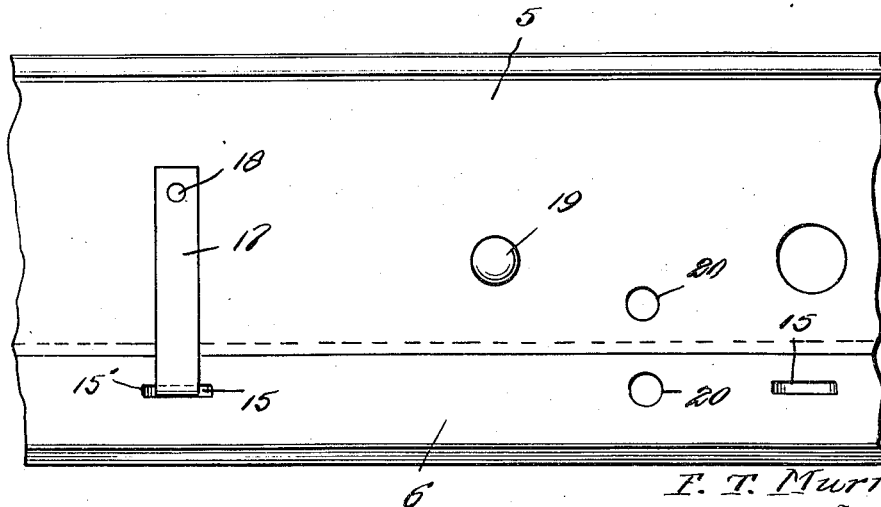

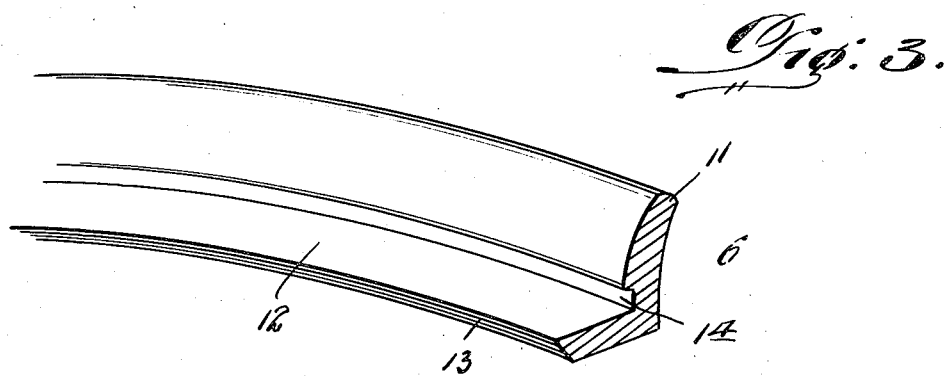
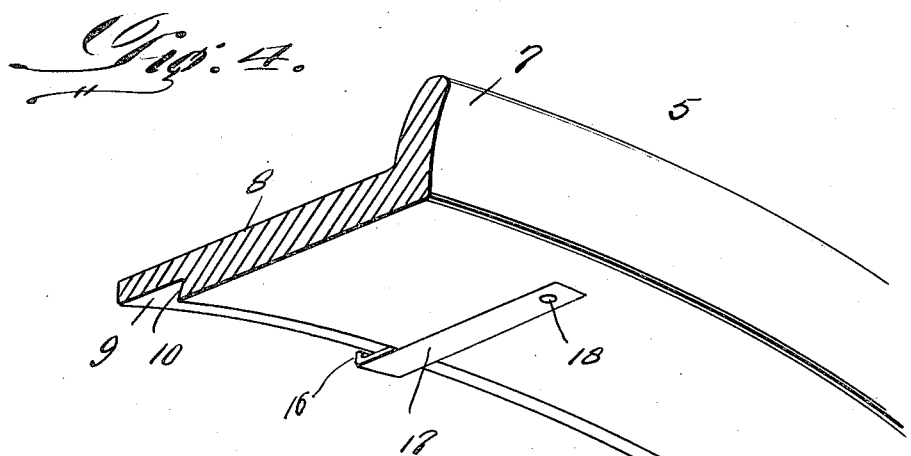
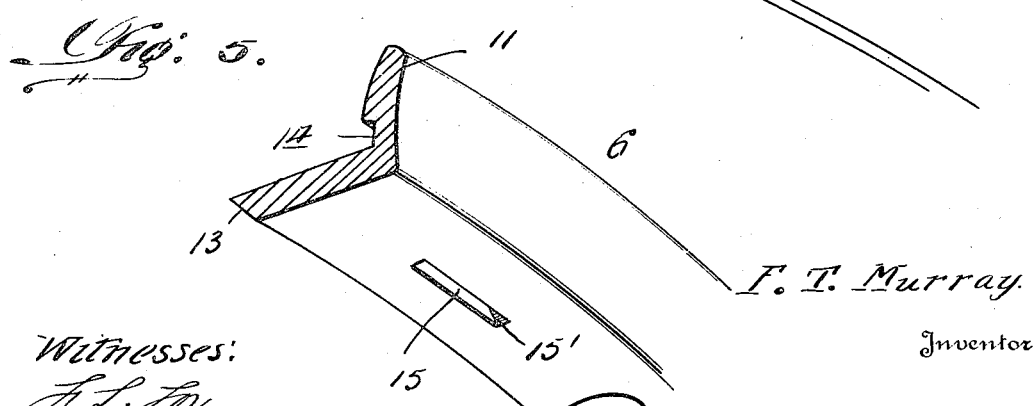

Patented July 15, 1924.                                    1,501,360

UNITED STATES PATENT OFFICE.

FRED T. MURRAY, OF CAMERON, SOUTH CAROLINA.

TIRE RIM.

Application filed March 5, 1923, Serial No. 622,717. Renewed May 16, 1924.

*To all whom it may concern:*

Be it known that FRED T. MURRAY, a citizen of the United States, residing at Cameron, in the county of Calhoun and State of South Carolina, has invented certain new and useful Improvements in Tire Rims, of which the following is a specification.

The main purpose of my invention is the provision of a tire rim wherein the same comprises a pair of sections adapted to be detachably secured together for permitting the easy removal therefrom or positioning thereon of the usual pneumatic tires.

A further purpose of my invention is the provision of a tire rim that is of extremely simple construction and one that may be readily knocked down or set up whenever it is desired to position thereon or remove therefrom a pneumatic tire.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 1 is a cross sectional view of my improved tire rim, the same being shown in position upon a vehicle wheel when carrying a conventional type of pneumatic tires;

Figure 2 is a fragmentary elevational view of the inner surface of my rim; and

Figures 3, 4 and 5 are fragmentary perspectives of the rim sections.

Referring to the drawings in detail, my rim comprises a pair of sections 5 and 6, the rim section 5 being formed with the usual vertical and outwardly curved flange 7 together with the tire receiving base portion 8. The under surface of this said base portion 8 is channelled at its edge as at 9, the inner edge of this channel being bevelled at 10.

The rim section 6 also comprises the flange 11 similar in all respects to the flange 7 of the said section 5, this section 6 also including an inwardly extending skirt portion 12, the edge of which is bevelled as at 13. The said flange 11 of the rim section 6 is formed with a channel 14 and as clearly shown in Figure 1 the said skirt portion of this rim section is adapted to be received within the channel 9 of the base portion 8 of the section 6, the edge of the base portion of the section 7 being received within the said channel 14 of the flange 11 of the other section.

The under surface of the flange 12 of the rim section 6 is provided with a desirable number of slots 15, the ends of the same being curved as at 15'. These slots are adapted for receiving the upwardly bent ends 16 of spring arms 17 pivotally secured at their opposite ends as at 18 to the said base portion 8 of the section 5 whereby the pair of sections are effectively maintained in locked engagement with each other.

The base portion 8 of the rim section 5 is formed with the usual rounded lug 19 for conveying into a notch within the usual stationary rim of an automobile wheel for preventing the movement of the rim upon the wheel. The sections 5 and 6 are further formed with alined openings 20 for the reception of a particular form of tool wherein the rim sections may be turned in opposite directions with respect to each other for consequently causing the hooked ends 16 of the said members 17 to ride outwardly of the slots 15 for permitting the sections to be separated.

In view of the above description it will at once be apparent that I have provided a highly improved form of tire rim that may be knocked down or set up in a comparatively easy manner for permitting of the easy removal therefrom or application thereto of a tire designated A.

In the drawings, I have shown my rim as being of a type adapted for receiving straight edge pneumatic tires it nevertheless being understood that this rim may be equally as well adapted for receiving tires of the clincher type without departing from the spirit and scope of the invention as claimed.

Having thus described my invention, what I claim as new and desire to secure by Letters Patent is:

A tire rim including a main rim section having a tire receiving base, a radial flange at one edge of the base and a channeled portion at the other edge of the inner surface, the inner edge of the channeled portion being beveled, and a co-operating rim section having a radial flange, an annular recess formed therein and a flange extending laterally on the inner edge of the radial flange having a beveled edge, said lateral flange seating in and co-operating with the channel of the main rim section, said flange being formed on the inner surface with a plurality of slots and resilient members mounted on the main flange and radially movable for engagement in said slots for locking the rim sections together, whereby the lateral flange of the co-operating rim section will seat in the channel and the beveled faces will co-operate for preventing relative radial movement in assembled relation, the edge of the main section fitting in the recess in the co-operating section, and said resilient member being disengageable from said slot upon a relative circumferential movement between the rim sections.

In testimony whereof I affix my signature.

FRED T. MURRAY.